(12) United States Patent
Kunz

(10) Patent No.: US 7,742,298 B2
(45) Date of Patent: Jun. 22, 2010

(54) PASSIVELY COOLED COMPUTER

(75) Inventor: Felix Kunz, Solothurn (CH)

(73) Assignee: Digital-Logic AG, Luterbach (CH)

( * ) Notice: Subject to any disclaimer, the term of this patent is extended or adjusted under 35 U.S.C. 154(b) by 0 days.

(21) Appl. No.: 12/205,217

(22) Filed: Sep. 5, 2008

(65) Prior Publication Data

US 2009/0067128 A1    Mar. 12, 2009

(30) Foreign Application Priority Data

Sep. 7, 2007    (CH) ..................... 1399/07

(51) Int. Cl.
*H05K 7/20* (2006.01)
*F28F 7/00* (2006.01)

(52) U.S. Cl. ............. 361/690; 165/80.3; 165/185; 361/679.46; 361/679.54; 361/679.59; 361/688; 361/715

(58) Field of Classification Search ........... 361/690
See application file for complete search history.

(56) References Cited

U.S. PATENT DOCUMENTS 4,241,380 A * 12/1980 Lehmann et al. ............ 361/690
4,771,365 A * 9/1988 Cichocki et al. ............ 361/705
4,953,058 A    8/1990 Harris
4,980,848 A    12/1990 Griffin et al.
5,089,935 A * 2/1992 Ito ............................ 361/692
5,276,584 A * 1/1994 Collins et al. ............... 361/718
5,671,120 A    9/1997 Kikinisi
6,459,577 B1   10/2002 Holmes et al.
6,493,227 B2 * 12/2002 Nielsen et al. .............. 361/703
6,545,874 B1 * 4/2003 Miller et al. ................ 361/752
6,552,899 B2 * 4/2003 Ronzani et al. ........ 361/679.54
7,072,179 B1 * 7/2006 Curran et al. .......... 361/679.21
7,095,611 B2   8/2006 Kunz
7,355,848 B1 * 4/2008 Hodge et al. ................ 361/690
2003/0117772 A1 * 6/2003 Searls et al. ................ 361/690
2004/0156180 A1   8/2004 Westerinen et al.
2006/0198112 A1   9/2006 Miller et al.

* cited by examiner

*Primary Examiner*—Gregory D Thompson
(74) *Attorney, Agent, or Firm*—Rankin, Hill & Clark LLP

(57) ABSTRACT

A passively cooled computer includes two or more components arranged in a housing frame 41, wherein each of these components is associated with a cooling body for dissipating waste heat of the component when the component is in operation. The cooling bodies each include a cooling surface, and these cooling surfaces are arranged to oppose one another with their cooling surfaces and thereby define an air channel leading vertically through the inside of the housing frame. The cooling bodies substantially separate the air channel from the remaining volume inside the housing frame.

15 Claims, 3 Drawing Sheets

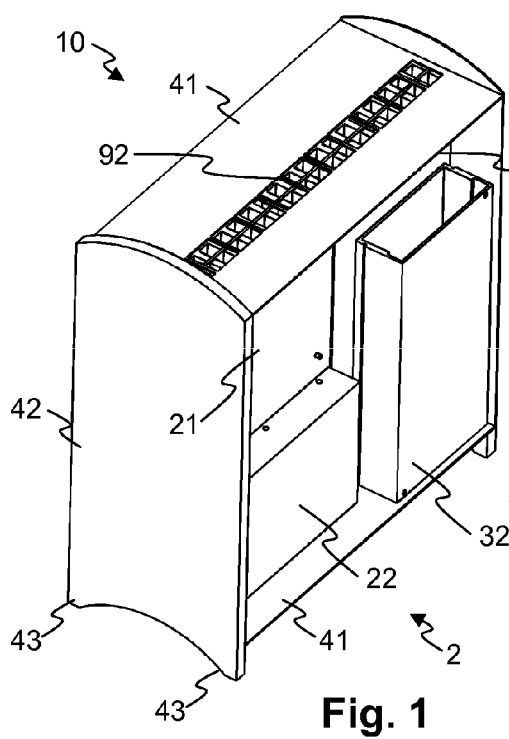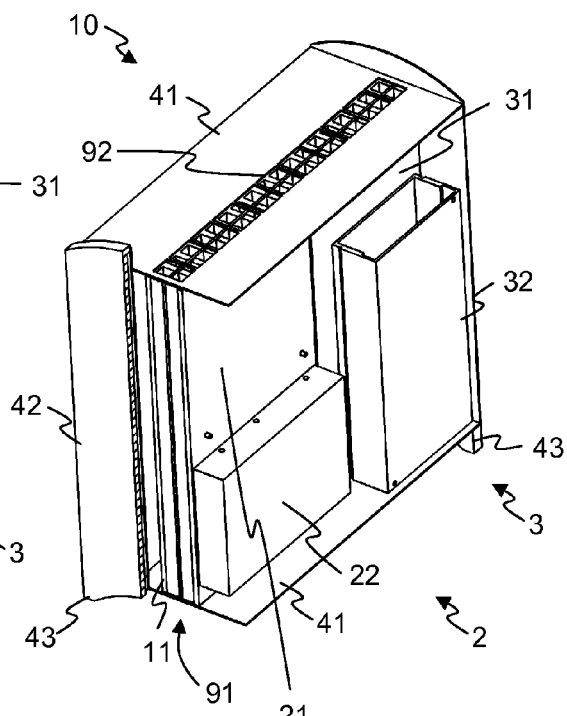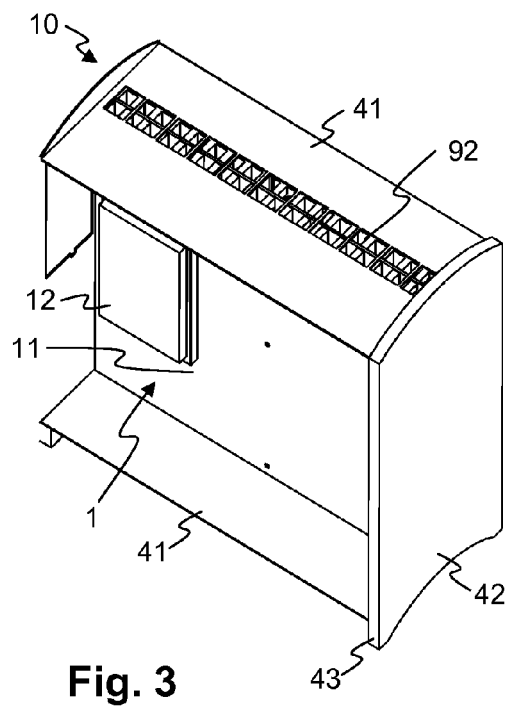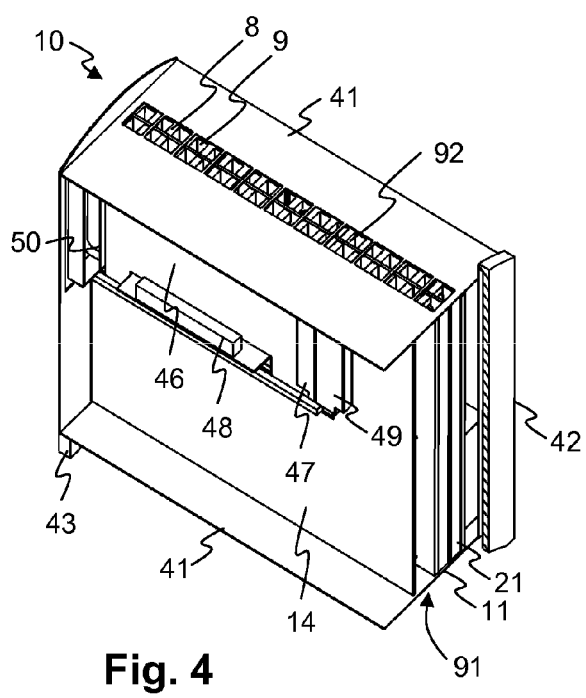

PASSIVELY COOLED COMPUTER

BACKGROUND OF THE INVENTION

The invention relates to electrical and electronic data processing devices, in particular to a passively cooled computer Such a computer is described in U.S. Pat. No. 7,095,611. The housing cover and floor of this computer are shaped as cooling elements. Internally, the computer is separated in an upper, hot compartment, and a lower, cooler compartment. Components with a larger heat loss, for example the processor, are arranged in the upper compartment. However, the temperature of the cooling elements can become uncomfortable, and the power that can be dissipated is limited.

U.S. Pat. No. 5,671,120 shows a personal computer, in which one side of the housing is configured to be a cooling body cooling the processor. The other sides of the housing consist of perforated plates which allow for an air flow through the entire inner volume of the housing. The openings in the side walls allow for objects to fall in and damage the computer.

U.S. Pat. No. 4,980,848 shows a laptop computer, in which components to be cooled are arranged behind the monitor and a gap in the monitor housing allows for the flow of air. The monitor housing comprises air entry openings at the bottom and exit openings at the top, allowing for heat to be transported away by convection.

US 2006/198112 A1 shows a computer with three sections. A middle section comprises a hard disc with cooling ribs attached to its top. In another section, a set of vertically arranged cooling ribs for cooling circuits is arranged. The cooling ribs form an internal channel, and corresponding holes may be arranged in the top and bottom. A fan is optional.

US 2004/156180 A1 describes a passively cooled computer with cooling ribs pointing outwards. In between the cooling ribs, among others, a motherboard is arranged, with the processor being pressed against one of the cooling bodies by elastic elements. The hard disc is arranged between the cooling bodies and is separated from them by a flexible, vibration damping layer.

The known solutions do not provide for sufficient dissipation of power for the various different components of the computer. Thus, the processing power of modern processors cannot be made use of.

BRIEF SUMMARY OF THE INVENTION

It is the object of the invention, to provide for a passively cooled computer without the disadvantages described.

The passively cooled computer according to the invention has two or more components arranged in a housing frame, wherein each of these components is associated with a separate cooling body for transporting away the waste heat of the component during operation of the computer. The cooling bodies each include a cooling surface, and the cooling bodies are arranged with these cooling surfaces opposing each other and defining at least one air channel leading vertically through the inside of the housing frame.

This makes it possible to dissipate the entire waste heat of the computer without active cooling, that is, in particular, without fans, such that the long term operating temperature equilibrium inside the computer remains low and in a range that is tolerable for constant operation. The vertical channel leading through the entire housing causes a chimney effect transporting the cooling air through the channel. This chimney effect, as a rule occurs with a channel length of more than twenty centimeters (the term "vertical" is, throughout the entire application, used in relation to the computer in its operating position).

The cooling bodies preferably substantially separate the air channel from the remaining volume inside the housing frame. This causes the cooling air to come into contact with only the cooling surfaces of the cooling bodies. Since a closed cooling channel is provided, that is, there are no air holes in the housing or in the cooling bodies, damage by parts falling into the computer is eliminated.

In a preferred embodiment of the invention, the air channel comprises a lower air intake opening and an upper air outlet opening, and the air intake opening by the shape of the housing frame is distanced from a surface on which the computer is placed. In this manner the chimney between the cooling bodies is supplied with air. For this, preferably, the housing frame comprises a floor with an opening corresponding to the air intake opening of the air channel, and the floor is distanced by means of foot elements from a surface on which the computer is placed.

This invention allows for dissipation of the waste heat of a computer of typical power passively, that is, without fans, and without having to substantially limit the power of the computer and its components, in particular the processor, mass storage, power supply etc.

The housing frame preferably constitutes the carrying frame, on which the components or units of the computer such as processor(s), volatile memory (RAM), mass storage devices such as hard discs, CD and/or DVD-drives, interface adapters, power supply and/or batteries are mounted. The housing frame preferably is made of thin sheet metal parts, preferably with a thickness of less than one millimeter. This improves the thermal decoupling of the units having different temperatures. In order to further reduce thermal bridges between different housing sections, optional metallic cladding elements are arranged outside the housing frame, covering at least one side surface of the housing frame, and being distanced from the housing frame by an air gap.

At the top of the housing, a cladding that is permeable by air can be arranged, exhibiting (seen in a horizontal direction) a round or convex cross section. This prevents users from depositing objects on the housing and thereby obstructing the air channel.

As a result, different sections of the computer exhibit different temperatures adapted to the temperature operating ranges of the components. "Hot" units such as the processor unit are thereby separated from "cold" units such as hard disks and further from power units such as the power supply.

In a preferred embodiment of the invention, at least one mass storage device, in particular a hard disk drive, is thermally coupled to a mass storage device cooling body for dissipating the waste heat of the mass storage device. This cooling body is one of the cooling bodies defining the air channel. Consequently, this unit is passively cooled as well.

Preferably, the at least one mass storage device is flexibly suspended together with its mass storage device cooling body. That is, the mass storage unit is rigidly coupled to the associated cooling body. By means of the flexible suspension on the one hand the cooling body is thermally separated from the other cooling bodies, on the other hand, vibrations of the mass storage unit—typically a hard disk drive—are separated from the remaining structure. Thus, hardly any vibrations are transmitted to the housing, resulting in a virtually noiseless operation of the computer.

Preferably, this suspension is done by means of flexible elements, suspending the mass storage unit and its cooling body from an opposing cooling body, which, with the mass storage unit cooling body, forms the air channel. The mass storage unit and its cooling body are preferably suspended from the opposing cooling body alone, i.e. they are not suspended from any other elements of the computer or its housing, and are free to move or vibrate with respect to such other elements.

In a further preferred embodiment of the invention, at least one processor unit and one power supply are thermally coupled each to a dedicated, associated cooling body. These dedicated cooling bodies are preferably thermally separated from one another, that is, they do not touch, or are at least made of separate pieces.

The abovementioned cooling bodies preferably extend in a plane and are arranged with this plane in a vertical orientation. They preferably comprise cooling ribs which in particular run in a vertical direction. In this manner, a chimney or a plurality of partial chimneys can be formed between the vertical cooling ribs of two cooling bodies that are arranged with the cooling ribs opposing one another.

In a further preferred embodiment of the invention, an insulation layer is arranged between at least one pair of cooling bodies that oppose one another. Thus, this layer extends in parallel and in-between the cooling bodies and extends substantially over the entire opposing surfaces of the two cooling bodies. In this manner the cooling bodies are decoupled from one another with respect to infrared radiation, and almost not heat exchange between the cooling bodies will take place. This allows arrangement of components and cooling bodies with different temperatures opposite one another without the hotter cooling body heating up the cooler one.

Further preferred embodiments of the invention correspond to the dependent claims.

BRIEF DESCRIPTION OF THE FIGURES

The subject matter of the invention will be explained in more detail in the following text with reference to preferred exemplary embodiments which are illustrated in the attached drawings, in which:

Figs. 1-4 are partially cut open views of a passively cooled computer;

The reference symbols used in the drawings, and their meanings, are listed in summary form in the list of reference numbers. In principle, identical parts are provided with the same reference numbers in the figures.

DETAILED DESCRIPTION OF THE INVENTION

Figure 5:
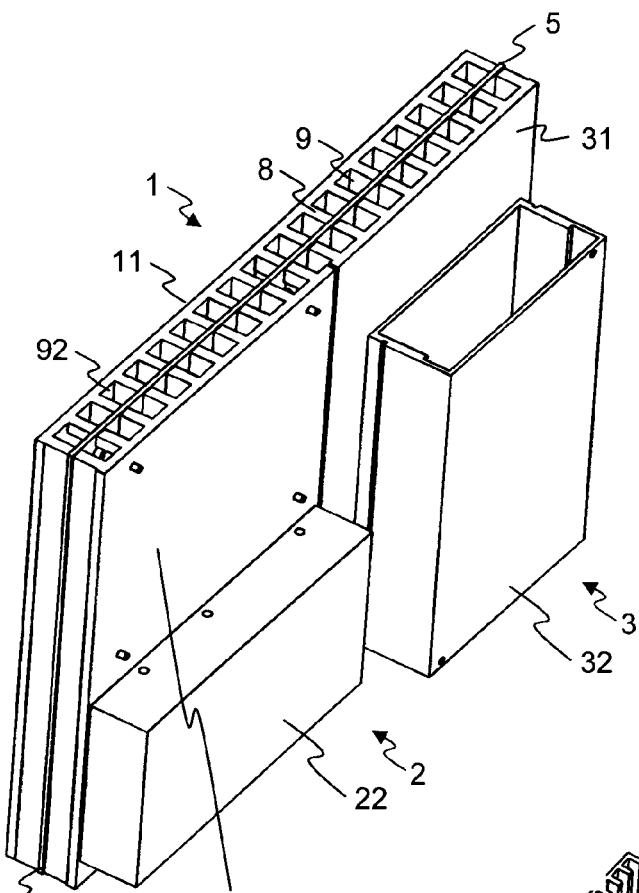
FIG. 5 is an arrangement of cooling bodies forming an air channel.
Figure 6:
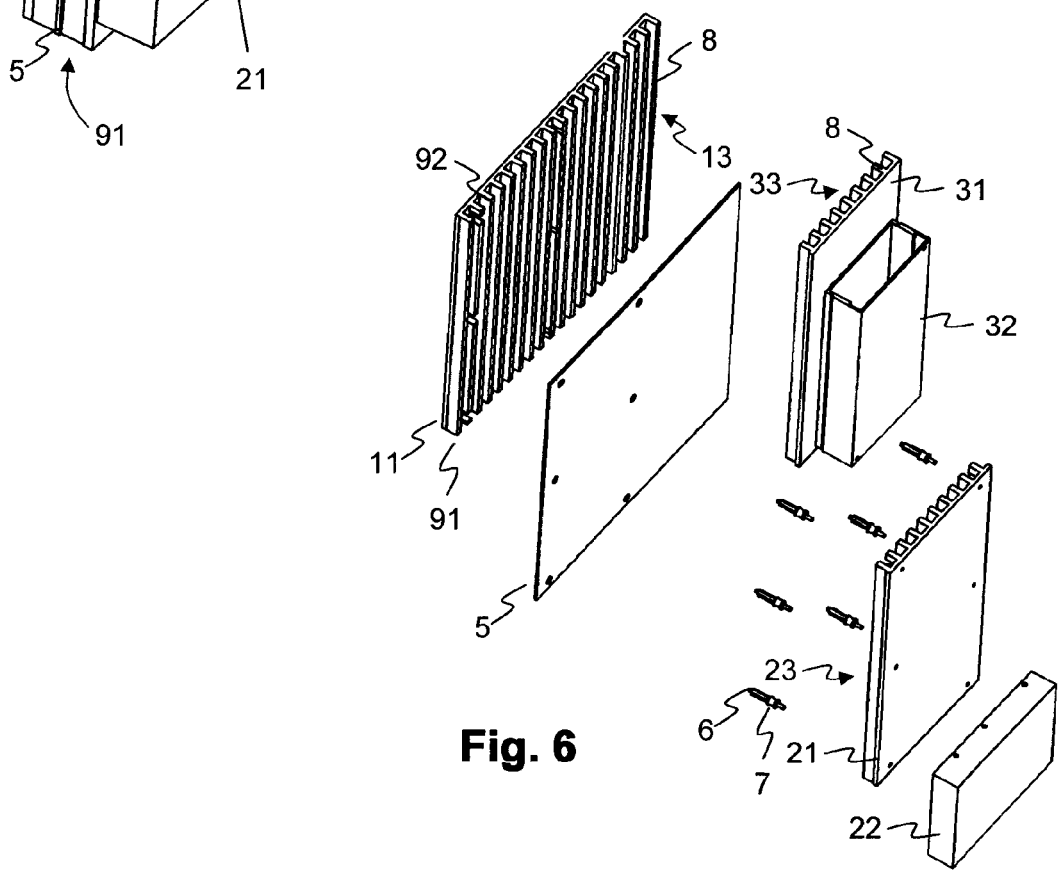
FIG. 6 is an exploded view of this arrangement.
Figure 7:
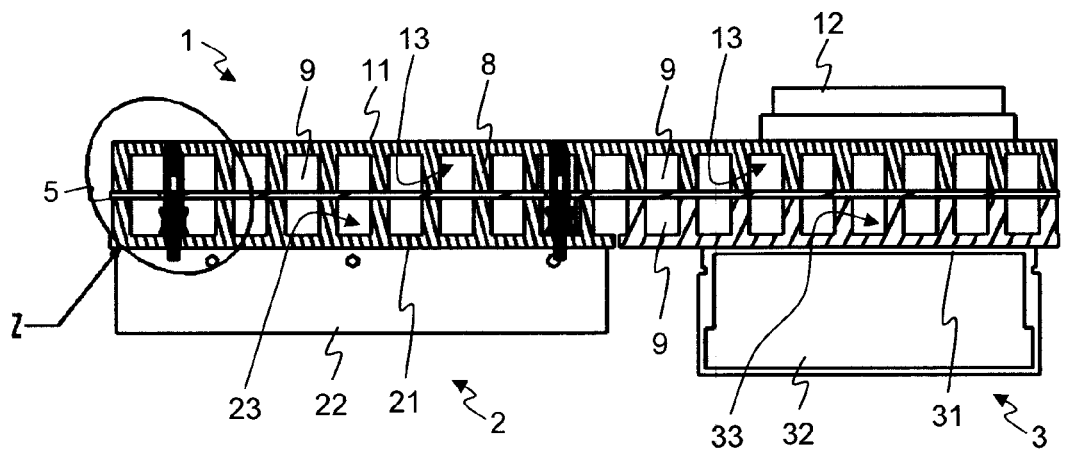
FIG. 7 is a sectional view of this arrangement.

The main elements of a computer cooled according to the invention are shown in FIGS. 1 to 4. The computer is shown in its operating condition, that is, with vertically oriented cooling channels. The main elements of the cooling arrangement alone are shown in FIGS. 5 to 7.

The computer 10 comprises several units 1, 2, 3 which are arranged in a housing 4 with a load carrying housing frame 41:

A processor unit 1 with one or more processors 12 and further elements typically arranged on a motherboard of a computer. The processor 12 and optionally also some of the further elements are thermally coupled to a processor cooling body 11, for example by mechanically pressing them against one another, with a thermally conductive material placed in-between for bridging gaps. The processor cooling body 11 is, in a border area, attached to the housing frame 41.

Figure 8:
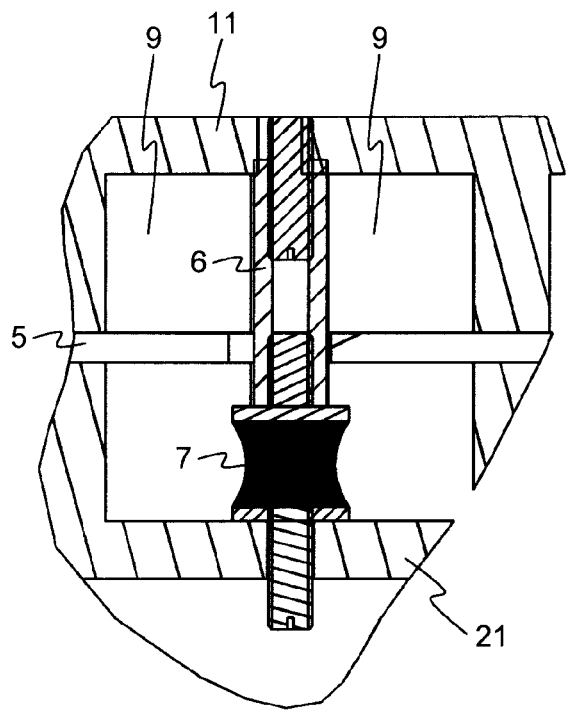
FIG. 8 is a detail from the area Z of figure rubber element rubber element 7.

A hard disk unit 2 with one or more hard disks 22. The hard disk unit(s) 2 are thermally coupled to a hard disk cooling body 21. The hard disk cooling body 21 is mounted to the opposing processor cooling body 11 by means of a flexible suspension made of distance bolts 6 and rubber elements 7. This can be seen in more detail in FIGS. 6, 7 and 8.

A power supply unit 3 with a power supply 32. The power supply 32 is thermally coupled to a power supply cooling body 31. The power supply cooling body 31 is, in a boundary area, attached to the housing frame 41. The power supply 32 itself is configured for passive cooling.

The cooling bodies 11, 21, 31 are substantially planar and each comprise, on cooling surfaces 13, 23, 33 which are opposite to the components to be cooled, cooling ribs 8. The cooling surfaces 13, 23, 33 are arranged substantially vertical (when the computer is in its operating position or condition), with the cooling ribs 8 also running in a vertical direction.

The cooling bodies 11, 21, 31 with their cooling surfaces 13, 23, 33 define one or more air channels 9. These also run in a vertical direction, corresponding to the orientation of the cooling surfaces 13, 23, 33 and the cooling ribs 8, respectively. The air channels 9 are closed, by means of the cooling bodies 11, 21, 31, with respect to the remaining volume inside the housing frame 41.

The air channels 9 at their common lower end form an air intake opening 91, and at their common upper end form an air outlet opening 92. Correspondingly, in the region of these openings there are arranged openings of the housing frame 41. Below the air intake opening 91 the air is guided in sideways by means of the air intake opening 91 being elevated with respect to the surface on which the computer 10 is standing. This is accomplished, for example, by raising the housing frame 41 by feet 43. Alternatively, the housing frame 41 comprises lateral air intake openings at its sides, and a hollow space leading from these lateral air intake openings to the air intake opening 91.

Preferably, a cladding with topside and/or lateral air outlet openings is arranged above the air outlet opening 92. The cladding can be bent in a convex shape or be inclined, to prevent the air outlet from being obstructed by objects placed on the computer.

In the embodiment of the invention shown, the hard disk cooling body 21 and the power supply cooling body 31 are separated, that is, they are made of separate pieces, and they are arranged with their cooling surfaces 23, 33 opposing the cooling surface 13 of the processor cooling body 11. Preferably, insulation 5 is arranged between the cooling surfaces opposing one another, in order to prevent a heat exchange by radiation. This insulation 5 consists, for example, of a synthetic heat resistant material with a thickness of around ca. one millimeter.

The housing frame 41 can be covered with external cladding elements, for example by a housing cladding 42. This covers at least one lateral surface of the computer 10. For esthetic or stability reasons it may be desirable to have the housing cladding 42 made of metal. In this case, in order to prevent a heat transfer from one side to the other (i.e. from the hot to the cool side), such a housing cladding 42 is not simply screwed flat onto the housing frame 41, but rather comprises a cutout 44 and/or is distanced from the housing frame 41 by means of distance elements 45, such that an insulating layer of air is created between the housing frame 41 and the housing cladding 42.

Figure 9:
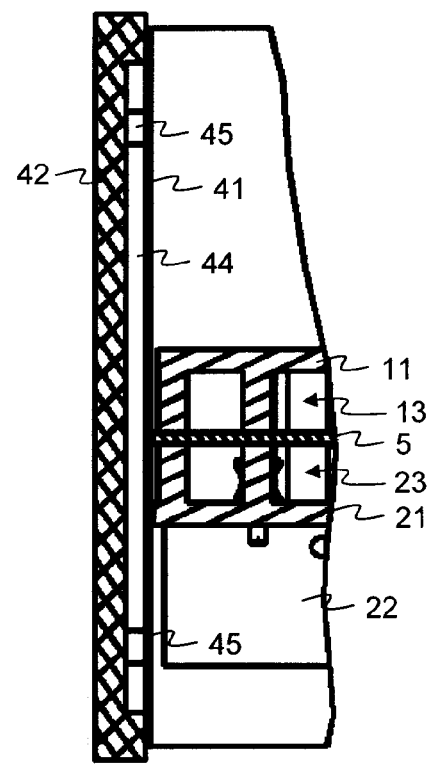
FIG. 9 is a cross section of a detail from part of a housing cladding.

The end plate of the housing cladding 42 shown in the figures thus comprises, on the one hand, feet 43 for raising the housing frame 41, and on the other hand a cutout 44 on the inside. FIG. 9 shows a horizontal sectional view through an endplate and the adjoining region of the housing frame 41. The load carrying housing frame 41 made of thin sheet metal does not form a substantial bridge transferring heat from the hotter part with the processor unit 1 and the processor cooling body 11 into the cooler part of the power supply unit 3 with the power supply cooling body 31. In order to prevent this heat transfer from taking place through the housing cladding 42, the housing cladding 42 is separated from the housing frame 41 by the air gap created by the cutout 44.

FIG. 4 shows a motherboard 14 which is arranged in parallel with the processor cooling body 11 and carries further electronic components of the computer 10. The processor 12 by means of its connectors is attached to the motherboard 14. In another preferred embodiment of the invention, the processor is attached to the motherboard 14, and a cooling block is pressed against the processor and conducts the heat of the processor to the processor cooling body 11.

In FIG. 4 a plug-in card carrier 46 is shown. It comprises a vertically arranged card carrier which can be pulled out of the computer 10 by means of a handle 50. In an inserted state, the card carrier is plugged in a slot connector 49 of the computer 10 by means of a carrier connector 47. The card carrier comprises an adapter connector 48 into which an extension card (not shown) can be plugged in, whereby the extension card is also arranged vertically. In this manner, the extension card can also be passively cooled by a vertical air current.

By combining the different measures described, it is made possible, for example, to keep the temperature difference between different units significantly high, also in the stationary condition, after several hours of operation. For example, the temperature of the processor unit may be 70° C., and the temperature of the hard disk unit 35° C. The vertical cooling bodies 11, 21, 31 and air channel(s) 9 thus divide the inside of the computer 10 in a warmer part, comprising components with a relatively high power loss, on one side of the air channel(s) 9 and a cooler part, comprising components with a relatively low power loss, on the opposite side of the air channel(s) 9.

In an exemplary computer according to the invention, it is possible to dissipate a maximal power of ca. 150 W. For this, ca. 4 kg of aluminum are used for the cooling bodies. The outer dimensions of the housing frame 41 are about 40 cm (height) by 40 cm (depth) by 18 cm (width).

LIST OF REFERENCE NUMBERS

1 processor unit
11 processor cooling body
12 processor
13 cooling surface
14 motherboard
2 hard disk unit
21 hard disk cooling body
22 hard disk
23 cooling surface
3 power supply unit
31 power supply cooling body
32 power supply
33 cooling surface
4 housing
41 housing frame
42 housing cladding
43 feet
44 cutout
45 distance element
46 plug-in card carrier
47 carrier connector
48 adapter connector
49 slot connector
50 handle
5 insulation
6 distance bolt
7 rubber element
8 cooling rib
9 air channel
91 air intake opening
92 air outlet opening
10 computer

The invention claimed is:

1. A passively cooled computer, comprising:
   at least two components arranged in a housing frame,
   wherein each of these components is associated with a cooling body for dissipating waste heat of the component when the component is in operation, and
   wherein the cooling bodies each comprise a cooling surface, and these cooling surfaces are arranged to face one another and thereby define an air channel leading vertically through the housing frame,
   wherein the cooling bodies comprise cooling ribs extending out of the cooling surfaces,
   wherein the cooling ribs are arranged to face one another, forming vertical channels, and
   wherein an insulation layer is arranged between the cooling ribs of at least one pair of cooling bodies that face one another.

2. The passively cooled computer of claim 1, wherein the cooling bodies substantially separate the air channel from a remaining volume within the housing frame.

3. The passively cooled computer of claim 1, wherein one of the at least two components is a mass storage device that is thermally coupled to one of the cooling bodies.

4. The passively cooled computer of claim 3, wherein the cooling body to which the mass storage device is thermally coupled is mounted to the other cooling body.

5. The passively cooled computer of claim 4, wherein the mass storage device is rigidly attached to the cooling body to which it is thermally coupled.

6. The passively cooled computer of claim 1, wherein the air channel comprises a lower air intake opening and an upper air outlet opening, and the air intake opening is distanced from a surface on which the computer is placed by the shape of the housing frame.

7. The passively cooled computer of claim 2, wherein the housing frame comprises a floor with an opening corresponding to an air intake opening of the air channel and the floor is distanced, by means of foot elements, from a surface on which the computer is placed.

8. A passively cooled computer, comprising:
   at least two or more components arranged in a housing frame,
   wherein each of these components is associated with a cooling body for dissipating waste heat of the component when the component is in operation,
   wherein the cooling bodies each comprise a cooling surface, and these cooling surfaces are arranged to face one another and thereby define an air channel leading vertically through the housing frame, wherein one of the at least two components is a mass storage device that is thermally coupled to one of the cooling bodies, and wherein the cooling body to which the mass storage device is thermally coupled is mounted by means of flexible elements to the other cooling body.

9. The passively cooled computer of claim 8, wherein the cooling body to which the mass storage device is thermally coupled is mounted to no other structure except for the other cooling body.

10. The passively cooled computer of claim 8, wherein the cooling bodies each extend in a plane and are arranged within this plane in a vertical orientation.

11. The passively cooled computer of claim 8, wherein the cooling bodies and the air channel divide an inside of the computer into a warmer part comprising components with a relatively high power loss on one side of the air channel and a cooler part comprising components with a relatively low power loss on the opposite side of the air channel.

12. A passively cooled computer, comprising:

at least two components arranged in a housing frame, wherein each of these components is associated with a cooling body for dissipating waste heat of the component when the component is in operation, wherein the cooling bodies each comprise a cooling surface, and these cooling surfaces are arranged to face one another and thereby define an air channel leading vertically through the housing frame, wherein the cooling bodies substantially separate the air channel from a remaining volume inside within the housing frame, wherein one of the at least two components is a processor unit that is thermally coupled to one of the cooling bodies, and wherein the passively cooled computer further comprises a power supply unit that is thermally coupled to a separate cooling body from the cooling body to which the processor unit is thermally coupled.

13. A passively cooled computer, comprising:

at least two components arranged in a housing frame, wherein each of these components is associated with a cooling body for dissipating waste heat of the component when the component is in operation, and wherein the cooling bodies each comprise a cooling surface, and these cooling surfaces are arranged to face one another and thereby define an air channel leading vertically through the housing frame, wherein the cooling bodies substantially separate the air channel from a remaining volume within the housing frame, wherein the housing frame comprises a floor with an opening corresponding to an air intake opening of the air channel and the floor is distanced, by means of foot elements, from a surface on which the computer is placed, and wherein the computer further comprises metal housing cladding elements arranged outside of the housing frame, said cladding elements covering at least one side surface of the housing frame and being distanced from the housing frame by an air gap.

14. The passively cooled computer of claim 13, wherein the housing frame consists of thin sheet metal parts with a thickness of less than one millimeter.

15. A passively cooled computer, comprising:

at least two components arranged in a housing frame, wherein each of these components is associated with a cooling body for dissipating waste heat of the component when the component is in operation, and wherein the cooling bodies each comprise a cooling surface, and these cooling surfaces are arranged to face one another and thereby define an air channel leading vertically through the housing frame, wherein one of the at least two components is a mass storage device that is thermally coupled to one of the cooling bodies, wherein the mass storage device is rigidly attached to the cooling body to which it is thermally coupled, and wherein the cooling body to which the mass storage device is thermally coupled is mounted by means of flexible elements to the other cooling body.

* * * * *